United States Patent
Kimura et al.

(10) Patent No.: US 10,022,705 B2
(45) Date of Patent: Jul. 17, 2018

(54) EXHAUST GAS PURIFYING CATALYST

(71) Applicants: HONDA MOTOR CO., LTD., Tokyo (JP); Mitsui Mining & Smelting Co., Ltd., Tokyo (JP)

(72) Inventors: Toshiaki Kimura, Saitama (JP); Hiroyuki Horimura, Saitama (JP); Takumi Yamaguchi, Saitama (JP); Takeshi Endo, Saitama (JP); Akihiro Iimuro, Saitama (JP); Ryoichi Oshima, Saitama (JP); Ohki Houshito, Saitama (JP); Yunosuke Nakahara, Saitama (JP)

(73) Assignees: HONDA MOTOR CO., LTD., Tokyo (JP); Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 15/504,430

(22) PCT Filed: Oct. 21, 2015

(86) PCT No.: PCT/JP2015/079678
§ 371 (c)(1),
(2) Date: Feb. 16, 2017

(87) PCT Pub. No.: WO2016/092957
PCT Pub. Date: Jun. 16, 2016

(65) Prior Publication Data
US 2017/0232425 A1    Aug. 17, 2017

(30) Foreign Application Priority Data
Dec. 12, 2014    (JP) ................. 2014-251973

(51) Int. Cl.
*B01J 23/63*    (2006.01)
*B01D 53/94*    (2006.01)
(Continued)

(52) U.S. Cl.
CPC ............ *B01J 23/63* (2013.01); *B01D 53/945* (2013.01); *B01D 53/9454* (2013.01);
(Continued)

(58) Field of Classification Search
CPC . B01J 23/63; B01J 35/023; B01J 35/04; B01J 35/1061; B01J 35/1066;
(Continued)

(56) References Cited

U.S. PATENT DOCUMENTS 6,808,687 B1    10/2004    Uenishi et al.
8,999,252 B2    4/2015    Cho
(Continued)

FOREIGN PATENT DOCUMENTS

JP    6-226096    8/1994
JP    10-296085    11/1998
(Continued)

OTHER PUBLICATIONS

International Search Report of PCT/JP2015/079678 dated Dec. 22, 2015.
(Continued)

*Primary Examiner* — Patricia L. Hailey
(74) *Attorney, Agent, or Firm* — Rankin, Hill & Clark LLP

(57) ABSTRACT

To reduce an OSC material, while maintaining necessary OSC capacity; and to improve heat resistance and reactivity of a precious metal. Proposed is an exhaust gas purifying catalyst which comprises a first catalyst layer that is formed on the surface of a substrate that is formed of a ceramic or a metal, and a second catalyst layer that is formed on the upper side of the first catalyst layer. The first catalyst layer comprises a precious metal, an OSC material and an alumina, and the OSC material and the alumina are comprised at a mass ratio of OSC material:alumina=1:7 to 1:3. The
(Continued)

second catalyst layer comprises a precious metal, an OSC material and an alumina, and the OSC material and the alumina are comprised at a mass ratio of OSC material: alumina=1:1 to 10:0.

20 Claims, 1 Drawing Sheet

(51) Int. Cl.
*B01J 35/04* (2006.01)
*B01J 35/02* (2006.01)
*F01N 3/10* (2006.01)

(52) U.S. Cl.
CPC ............ *B01J 35/023* (2013.01); *B01J 35/04* (2013.01); *F01N 3/101* (2013.01); *B01D 2255/1021* (2013.01); *B01D 2255/1023* (2013.01); *B01D 2255/1025* (2013.01); *B01D 2255/908* (2013.01); *B01D 2255/9022* (2013.01); *B01D 2255/9202* (2013.01); *F01N 2370/02* (2013.01)

(58) Field of Classification Search
CPC .... B01D 2255/1021; B01D 2255/1023; B01D 2255/1025; B01D 2255/9022; B01D 2255/908; B01D 2255/9202
See application file for complete search history.

(56) References Cited

U.S. PATENT DOCUMENTS

| | | | | |
|---|---|---|---|---|
| 2002/0031452 | A1* | 3/2002 | Okamoto | B01D 53/9422 422/168 |
| 2005/0129588 | A1* | 6/2005 | Nunan | B01D 53/945 422/177 |
| 2009/0173065 | A1 | 7/2009 | Cho | |
| 2010/0212293 | A1* | 8/2010 | Deeba | B01D 53/945 60/274 |
| 2012/0088655 | A1* | 4/2012 | Yabuzaki | B01D 53/945 502/174 |
| 2012/0128557 | A1* | 5/2012 | Nunan | B01D 53/945 423/213.5 |
| 2012/0165185 | A1* | 6/2012 | Gramiccioni | B01D 53/945 502/217 |
| 2014/0205523 | A1* | 7/2014 | Arnold | B01J 23/63 423/213.5 |
| 2014/0329669 | A1 | 11/2014 | Fujimura et al. | |
| 2014/0369912 | A1* | 12/2014 | Zheng | B01J 23/63 423/213.5 |

FOREIGN PATENT DOCUMENTS

| | | | |
|---|---|---|---|
| JP | 11-169712 | 6/1999 | |
| JP | 2001-79404 | 3/2001 | |
| JP | 2001-145836 | 5/2001 | |
| JP | 2002-11350 | 1/2002 | |
| JP | 2003-170047 | 6/2003 | |
| JP | 2007275704 A2 | 10/2007 | |
| JP | 2007-313456 | 12/2007 | |
| JP | 2013-184125 | 9/2013 | |
| JP | 2013-208578 | 10/2013 | |
| JP | 2013-220401 | 10/2013 | |
| JP | 2014-117701 | 6/2014 | |
| JP | 2014-144426 | 8/2014 | |
| WO | 2010/109734 | 9/2010 | |
| WO | 2013/111457 | 8/2013 | |
| WO | 2014/156676 | 10/2014 | |
| WO | 2017/109514 | * 6/2017 | ............. B01J 23/63 |

OTHER PUBLICATIONS

Japanese Notice of Allowance dated Mar. 27, 2018 issued in the corresponding Japanese patent application No. 2016-563562.

* cited by examiner

[Fig.1]
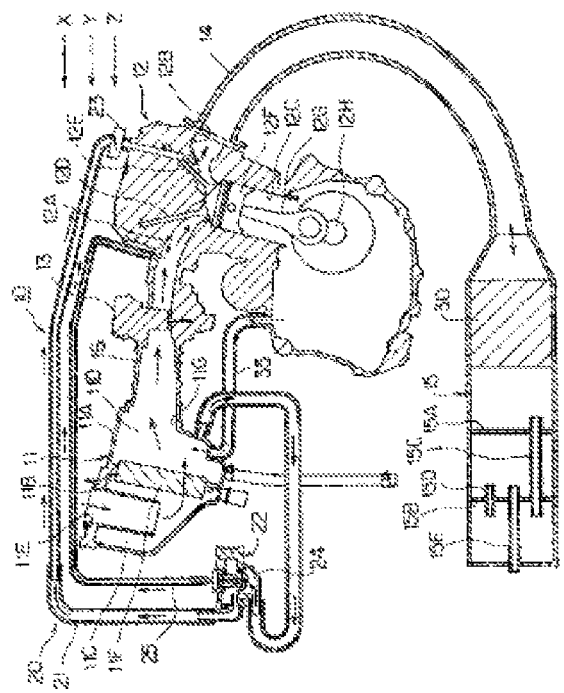
[Fig.2]
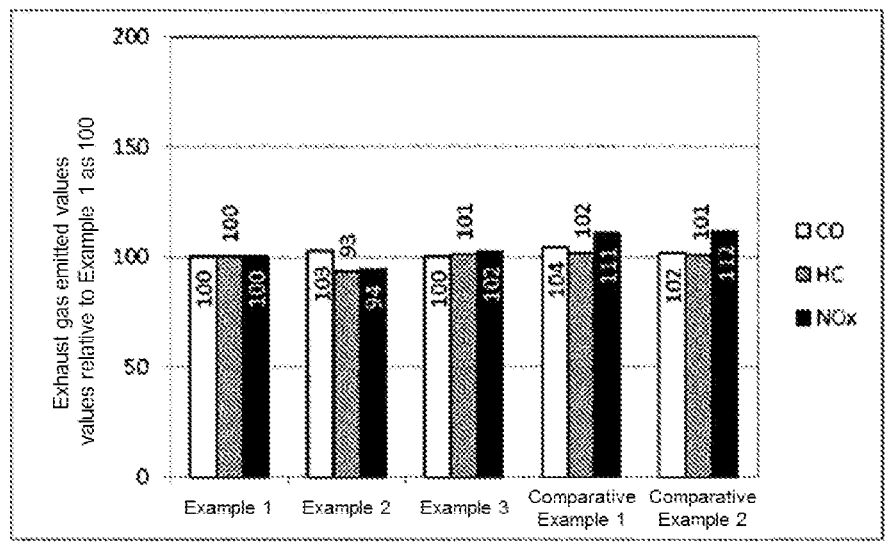

EXHAUST GAS PURIFYING CATALYST

TECHNICAL FIELD

The present invention relates to an exhaust gas purifying catalyst which can be suitably used for purifying an exhaust gas emitted from an internal-combustion engine of four-wheel or two-wheel automobiles or the like.

BACKGROUND ART

Exhaust gases to be emitted from an internal-combustion engine using gasoline as a fuel include harmful components such as total hydrocarbons (THC), carbon monoxide (CO), and nitrogen oxides (NOx). As such, it is necessary to purify each of the harmful components using a catalyst in such a manner that the total hydrocarbons (THC) are converted into water and carbon dioxide by oxidation, the carbon monoxide (CO) is converted into carbon dioxide by oxidation, and the nitrogen oxides (NOx) are converted into nitrogen by reduction.

As such a catalyst for treating exhaust gas (hereinafter, referred to as "exhaust gas purifying catalyst"), three way catalysts (TWCs) capable of oxidizing and reducing CO, THC and NOx have been used.

As such three way catalyst, a catalyst, in which a precious metal is supported on an inorganic porous material having a wide specific surface area, for instance, an alumina porous material having a wide specific surface area and then this is supported on a substrate, for instance, a monolithic substrate made of a refractory ceramic or metallic honeycomb structure or on refractory particles, is known.

The precious metal in this kind of three way catalyst has a function by which hydrocarbons in the exhaust gas are converted into water and carbon dioxide by oxidation, and carbon monoxide in the exhaust gas is converted into carbon dioxide by oxidation; meanwhile, nitrogen oxides in the exhaust gas are converted into nitrogen by reduction. Thus, it is preferable to maintain a ratio of fuel to air (air-fuel ratio) constantly (at the theoretical air-fuel ratio) in order to effectively provide a catalytic action with respect to both the reactions at the same time.

The air-fuel ratio of internal-combustion engines of automobiles and the like largely changes depending on driving conditions such as acceleration, deceleration, low-speed driving, and high-speed driving, and thus the air-fuel ratio (A/F) which fluctuates depending on the operating conditions of the engine is constantly controlled by using an oxygen sensor (zirconia). However, it is not possible for the catalyst to sufficiently exert performance as a purifying catalyst only by controlling the air-fuel ratio (A/F) as described above, and thus the catalyst layer itself is also required to have an action of controlling the air-fuel ratio (A/F). Hence, a catalyst obtained by adding a promoter to a precious metal which is a catalytically active component is used for a purpose to prevent a decrease in the purification performance of the catalyst caused by the change in the air-fuel ratio by the chemical action of the catalyst itself.

As such a promoter, a promoter (referred to as "OSC material") having oxygen storage capacity (OSC) to release oxygen in a reducing atmosphere and to absorb oxygen in an oxidizing atmosphere is known. For instance, ceria (cerium oxide, $CeO_2$) or ceria-zirconia composite oxide is known as the OSC material having the oxygen storage capacity.

Ceria ($CeO_2$) has a characteristic that extends a range (window) of the air-fuel ratio capable of efficiently purifying CO, THC, and NOx, and in which desorption and absorption of attached oxygen and lattice oxygen in the cerium oxide can be performed depending on a level of an oxygen partial pressure in the exhaust gas. In other words, when the exhaust gas has a reducing property, the cerium oxide desorbs the oxygen ($CeO_2 \rightarrow CeO_{2-x} + (x/2)O_2$) to feed the oxygen into the exhaust gas, thereby causing an oxidation reaction. On the other hand, when the exhaust gas has an oxidizing property, the cerium oxide reversely takes the oxygen in oxygen deficiency ($CeO_{2-x} + (x/2)O_2 \rightarrow CeO_2$), thereby reducing an oxygen concentration in the exhaust gas to cause a reduction reaction. In this way, the cerium oxide fulfills a function as a buffer that decreases a change in the oxidizing and reducing properties of the exhaust gas, and has a function of maintaining the purification performance of the catalyst.

Further, the ceria-zirconia composite oxide that causes zirconia to be dissolved in this ceria is added to many catalysts as the OSC material, because the oxygen storage capacity (OSC) thereof is further excellent.

The ceria-zirconia composite oxide is compatible with the precious metal, and therefore, when the precious metal is supported on the ceria-zirconia composite oxide, an anchoring effect is exerted and the ceria-zirconia composite oxide is hardly sintered even a thermal load is applied thereto, thereby dispersibility can be maintained. Thus, the ceria-zirconia composite oxide is used as not only the OSC material but also a carrier of the precious metal.

However, since the ceria-zirconia is a rare earth and expensive, in order to provide an inexpensive catalyst, there has been a limit to use the ceria-zirconia composite oxide as the carrier of the precious metal.

Therefore, a catalyst, in which the OSC material such as ceria or ceria-zirconia composite oxide is used as the carrier of the precious metal along with alumina, and the catalyst purification performance can be inexpensively and stably exerted, has been hitherto disclosed.

For instance, Patent Document 1 (JP H06-226096 A) discloses an exhaust gas purifying catalyst which comprises a first catalyst layer formed on the surface of a catalyst carrier and containing Pd and alumina, and a second catalyst layer formed on the outer surface of the first catalyst layer and containing Pd and ceria.

Patent Document 2 (JP H10-296085 A) discloses an exhaust gas purifying catalyst having two or more catalyst coat layers on a catalyst substrate, wherein an upper layer of the catalyst coat layers comprises a refractory inorganic oxide mainly composed of activated alumina, at least one element selected from the group of Ce, Zr and compounds thereof, and Rh, and a lower layer of the catalyst coat layers comprises a refractory inorganic oxide mainly composed of activated alumina, and Ce, Zr, Pd and Ba.

Patent Document 3 (JP 2001-79404 A) discloses an exhaust gas purifying catalyst which comprises a heat-resistant support carrier, a first coating layer which is directly supported and formed on the surface of the heat-resistant support carrier, and a second coating layer formed on the first coating layer, wherein the first coating layer includes palladium and alumina, and the palladium is supported on a part or whole of the alumina, and the second coating layer includes at least one of platinum or rhodium, and a zirconia-cerium composite oxide and at least either the platinum or the rhodium is supported on a part or whole of the zirconia-cerium composite oxide.

Patent Document 4 (JP 2002-11350 A) discloses an exhaust gas purifying catalyst, in which a first coating layer is formed on a heat-resistant support carrier and a second coating layer is formed on the first coating layer, wherein the first coating layer contains alumina on which palladium is supported, and the second coating layer contains a Ce—Zr-based composite oxide on which platinum and rhodium are coexistently supported and a Zr—Ce-based composite oxide on which platinum and rhodium are coexistently supported and the composition thereof is different from the aforementioned composite oxide.

Patent Document 5 (JP 2013-184125 A) discloses an exhaust gas purifying catalyst which comprises a Pd catalyst layer containing Pd particles and a Rh catalyst layer containing Rh particles formed on the Pd catalyst layer, wherein a Pd carrier for supporting the Pd particles in the Pd catalyst layer is a composite oxide containing $Al_2O_3$ as a main component and $ZrO_2$.

Patent Document 6 (JP 2013-220401 A) discloses an exhaust gas purifying catalyst which has a catalyst layer composed of an upper layer and a lower layer provided on a substrate. The upper layer contains Pt and Rh as a catalyst metal, and an oxide carrier supporting the catalyst metal, and has a CeZr-based composite oxide and an alumina composite oxide containing La as the oxide carrier, in which the Pt of the upper layer is supported only on the alumina composite oxide containing the La, and the Rh of the upper layer is supported on the CeZr-based composite oxide and the alumina composite oxide containing the La respectively. The lower layer contains Pd but not Rh as a catalyst metal, and has a CeZr-based composite oxide and an alumina composite oxide containing La as an oxide carrier supporting the catalyst metal, in which the Pd of the lower layer is supported on the CeZr-based composite oxide and the alumina composite oxide containing the La respectively.

Patent Document 7 (JP 2014-117701 A) discloses a gas purifying catalyst for an internal-combustion engine which includes a carrier and a catalyst layer formed on the carrier, wherein the catalyst layer has a first catalyst including a first support containing alumina and Pd supported on the first support, and a second catalyst including a second support containing a ceria-zirconia composite oxide and Rh supported on the second support.

Patent Document 8 (JP 2014-144426 A) discloses an exhaust gas purifying catalyst which comprises a first catalyst layer including Pd, an oxygen storage capacity (OSC) material, and an inorganic porous material, and a second catalyst layer including Pt or Rh or both of them and an inorganic porous material on a substrate, wherein, in the catalyst comprising a structure in which the second catalyst layer is disposed on the upper side of the first catalyst layer, the first catalyst layer contains one or two or more transition metals selected from a group consisting of Co, Ni, Mn, Cu, and Fe.

Patent Document 9 (WO 2014/156676) discloses a catalyst structure which comprises a substrate, an upper catalyst layer, and a lower catalyst layer, wherein the upper catalyst layer is a porous layer containing an inorganic porous material formed from an oxide whose crystalline structure belongs to an apatite type, and the lower catalyst layer is a porous layer containing an inorganic porous material having an oxygen storage/release capacity function (OSC function).

Incidentally, an exhaust gas purifying catalyst for a saddle-riding-type vehicle such as a two-wheeled automobile has special problems different from those of an exhaust gas purifying catalyst for a four-wheeled automobile. For instance, in comparison with the exhaust gas purifying catalyst for the four-wheeled automobile, the exhaust gas purifying catalyst for the two-wheeled automobile is required to have a small capacity and yet to exert a high purification capacity because of a limited space where the catalyst is mounted.

In this way, the exhaust gas purifying catalyst for the two-wheeled automobile has the special problems different from those of the exhaust gas purifying catalyst for the four-wheeled automobile. As such, the following proposals are made with respect to the conventional exhaust gas purifying catalyst for the two-wheeled automobile.

For instance, Patent Document 10 (JP 2001-145836 A) proposes an exhaust gas purifying catalyst that contains a metallic carrier comprising a cylindrical punching metal made of heat-resisting stainless steel, an undercoating layer of heat-resistant inorganic oxide to which an oxygen occlusion material placed on a surface of the carrier is added, and a catalyst supporting layer on which the catalyst placed on the undercoating layer is supported, as an exhaust gas purification catalyst that suppresses detachment of a catalyst layer caused by heat or vibrations to the minimum extent, suppresses thermal degradation of a catalytic material as well, and exerts good purification performance under severe conditions, and that uses cerium oxide or a composite oxide of cerium and zirconium as the oxygen occlusion material.

Patent Document 11 (WO 2010/109734) discloses an exhaust gas purifying catalyst for a saddle-riding-type vehicle which has a first catalyst layer formed on a surface of a carrier and a second catalyst layer formed on the first catalyst layer, wherein the first catalyst layer has a carrier which is formed from a composite oxide comprising 45 to 70% by mass of $CeO_2$, 20 to 45% by mass of $ZrO_2$, 2 to 20% by mass of $Nd_2O_3$, and 1 to 10% by mass of $La_2O_3$, and a catalyst component comprising a supported metal Pd or a Pd oxide, and the second catalyst layer has a carrier which is formed from a composite oxide comprising 50 to 95% by mass of $ZrO_2$, 0 to 40% by mass of $CeO_2$, 2 to 20% by mass of $Nd_2O_3$, and 1 to 10% by mass of $La_2O_3$, and a catalyst component comprising a supported metal Rh or an Rh oxide, or alternatively a catalyst component comprising a supported metal Rh or an Rh oxide and a catalyst component comprising a metal Pt or a Pt oxide.

Furthermore, Patent Document 12 (JP 2013-208578 A) discloses a palladium monolayer catalyst for an exhaust gas to be emitted from a saddle-riding-type vehicle which comprises a substrate as the exhaust gas purifying catalyst for a saddle-riding-type vehicle, and a catalyst layer, that has the form of a monolayer, which contains palladium as a catalyst active component, an inorganic porous material as a catalyst carrier, ceria ($CeO_2$) particles as a promoter component, and barium.

CITATION LIST

Patent Document

Patent Document 1: JP H06-226096 A
Patent Document 2: JP H10-296085 A
Patent Document 3: JP 2001-79404 A
Patent Document 4: JP 2002-11350 A
Patent Document 5: JP 2013-184125 A
Patent Document 6: JP 2013-220401 A
Patent Document 7: JP 2014-117701 A
Patent Document 8: JP 2014-144426 A
Patent Document 9: WO 2014/156676
Patent Document 10: JP 2001-145836 A Patent Document 11: WO 2010/109734
Patent Document 12: JP 2013-208578 A

SUMMARY OF THE INVENTION

Problem to be Solved by the Invention

Since the exhaust gas purifying catalyst for the saddle-riding-type vehicle suffers rapid atmospheric variation, and is easily exposed to a high temperature in comparison with the exhaust gas purifying catalyst for the four-wheeled automobile, there is a tendency that pores, which a material constituting the catalyst has, are likely to clog at every use. As the result, there may be a problem that a supported precious metal is buried in the pores, thereby the catalytic activity is reduced.

Further, in comparison with the four-wheeled automobile, since a catalyst has to be downsized in the saddle-riding-type vehicle and flow rate of the exhaust gas is fast, in most cases the catalyst is used under an environment where a space velocity of the passed exhaust gas is extremely high. For such reasons, there is also a problem that the exhaust gas is not diffused to the deep part of the catalyst layer and thus the performance of the catalyst cannot be sufficiently brought out.

In view of such problems, a first object of the present invention is to provide a new exhaust gas purifying catalyst, that can reduce usage of a rare earth having OSC and yet can have necessary OSC, in which heat resistance and reactivity of a precious metal can be maintained or improved, in particular, NOx purification performance can be enhanced.

Further, a second object of the present invention is to provide a new exhaust gas purifying catalyst, that can prevent to clog pores, which a catalyst constitutional material has, even in repeated use, and further can diffuse exhaust gas to the deep part of the catalyst layer.

Means for Solving Problem

Firstly, the present invention proposes an exhaust gas purifying catalyst having a first catalyst layer which is formed on a surface of a substrate comprising a ceramic or a metal and a second catalyst layer which is formed on the upper side of the first catalyst layer, wherein the first catalyst layer comprises a precious metal, an OSC material, and an alumina, and the OSC material and the alumina are comprised at a mass ratio of OSC material:alumina=1:7 to 1:3, and the second catalyst layer comprises a precious metal, an OSC material and an alumina, and the OSC material and the alumina are comprised at a mass ratio of OSC material:alumina=1:1 to 10:0.

Secondly, in the exhaust gas purifying catalyst which the present invention firstly proposes, the present invention further proposes an exhaust gas purifying catalyst, wherein an average particle size (D50) of the alumina in the first catalyst layer is 10 to 16 μm, and an average particle size (D50) of the OSC material in the first catalyst layer is 3 to 12 μm.

Effect of the Invention

By adjusting a mass ratio of the OSC material and the alumina respectively according to the role of each layer in the first catalyst layer and the second catalyst layer, the exhaust gas purifying catalyst which the present invention firstly proposes can reduce usage of the OSC material and yet can have necessary OSC, and can maintain or improve heat resistance and reactivity of a precious metal, in particular, can enhance NOx purification performance.

Further, by adjusting a particle size of the alumina and the OSC material which are the main material in each of the first catalyst layer and the second catalyst layer, the exhaust gas purifying catalyst which the present invention secondly proposes can prevent to clog pores, which a catalyst constitutional material has, even in repeated use, and further can diffuse exhaust gas to the deep part of the catalyst layer. As the result, since the burying into the pores of the precious metal component supported on those can be prevented and further the gas diffusibility in the catalyst layer can be improved, the catalytic activity is rarely reduced and the entire catalyst layer can be effectively utilized even in an internal-combustion engine which is used under an exhaust gas atmosphere where it is exposed to high temperature exhaust gas, and is a high space velocity to pass the catalyst. Thus, in particular, it is extremely suitable as an exhaust gas purifying three way catalyst for the saddle-riding-type vehicle.

BRIEF DESCRIPTION OF DRAWINGS

FIG. 1 is a schematic diagram illustrating one example of an exhaust gas purifying device for a saddle-riding-type vehicle which is suitable for mounting a catalyst of the invention, and one example of a peripheral constitution thereof.

FIG. 2 is a graph illustrating the results of real vehicle tests.

MODE(S) FOR CARRYING OUT THE INVENTION

Next, embodiments for carrying out the invention will be described. However, the invention is not limited to the embodiments described below.

<Present Catalyst>

The catalyst according to an example of the present embodiment (referred to as "present catalyst") is an exhaust gas purifying catalyst which comprises a first catalyst layer formed on a surface of a substrate and a second catalyst layer formed on the upper side of the first catalyst layer.

The "catalyst layer" which refers to the first catalyst layer and the second catalyst layer means a layer having a gas adsorption action or a gas purifying catalytic action. When a layer contains a catalytically active component such as a precious metal, the layer corresponds to the "catalyst layer" because the layer has a gas purifying catalytic action.

Further, the first catalyst layer and the second catalyst layer are also collectively referred to as "present catalyst layer".

<Substrate>

Examples of the substrate material used in the present catalyst may include a refractory material such as ceramics and a metal material.

Examples of the substrate material made of ceramics may include a refractory ceramic material, for instance, cordierite, cordierite-alpha alumina, silicon nitride, zircon mullite, spodumene, alumina-silica magnesia, zircon silicate, sillimanite, magnesium silicate, zircon, petalite, alpha alumina, alumino-silicates, and the like.

Examples of the substrate material made of metal may include a refractory metal, for instance, corrosion-resistant alloys based on stainless steel (SUS) or iron, and the like.

Examples of the shape of the substrate may include a honeycomb shape, a pellet shape, and a spherical shape.

As the honeycomb material, for instance, a cordierite material such as ceramics can be used. Further, a honeycomb body (also referred to as "metal honeycomb") made of metal material such as ferritic-based stainless steel can also be used.

The metal honeycomb can be formed by rolling a metal foil made of stainless steel or heat-resistant steel or the like. For instance, two honeycomb bodies are disposed in parallel at ingress and egress gas sides inside a metal outer cylinder at a regular interval, which can be given as an example. The honeycomb body may be directly inserted into an exhaust pipe or a muffler in place of the outer cylinder.

In addition, a cylindrical punching metal can also be used. When a punching metal called a punching pipe or a punching tube is used, heat resistance is improved, and through-holes are formed by punching. As such, a wide surface area is obtained, and exhaust gas purification performance is improved. Furthermore, since exhaust resistance inside the exhaust pipe is reduced, the punching metal is suitable for use as, for instance, a two-wheeled automobile.

In the case of using the honeycomb-shaped substrate, for instance, a monolithic substrate having numerous fine gas flow passages, that is, numerous channels, inside the substrate in parallel can be used so that a fluid circulates inside the substrate. In this case, the catalyst layer can be formed by coating, such as wash-coating, an inner wall surface of each channel of the monolithic substrate with a catalyst composition.

Further, in the case of a two-wheeled vehicle, particularly a small two-wheeled vehicle, the catalyst needs to be made small, and thus, it is also possible to employ a structure in which the shape of the substrate is divided into two pieces, for instance, by providing a separator at an inlet side of the catalyst, and causes a turn-flow at the other end by a hemispherical cap.

<First Catalyst Layer>

The first catalyst layer contains a precious metal, an OSC material and an alumina, wherein the catalyst layer contains the OSC material and the alumina at a mass ratio of OSC material:alumina=1:7 to 1:3.

(Precious Metal)

The first catalyst layer preferably contains a precious metal mainly including palladium (Pd) as a catalytically active component. That is, in the first catalyst layer, at least the largest precious metal is preferably Pd. Among them, it is preferable that Pd accounts for 50% by mass or more in the precious metal of the first catalyst layer, more preferably 80% by mass or more, and even more preferably 90% by mass or more (including 100% by mass).

Further, when the present catalyst has a honeycomb-shape, a supported amount of Pd is preferably 0.5 to 2.0 g per 1 liter catalyst in terms of metal in the entire present catalyst, and among them, more preferably 1.0 g or more or 1.8 g or less, and even more preferably 1.25 g or more or 1.6 g or less.

(OSC Material)

The first catalyst layer preferably includes a promoter (referred to as "OSC material") having oxygen storage capacity (OSC).

Examples of the OSC material may include a porous material such as a cerium oxide, a zirconium oxide and a ceria-zirconia composite oxide.

An average particle size (D50) of the OSC material in the first catalyst layer is preferably 3 to 12 μm. This is because when the average particle size (D50) of the OSC material in the first catalyst layer is 3 to 12 μm, adhesiveness with the substrate and purification performance are easily secured.

From such viewpoint, the average particle size (D50) of the OSC material in the first catalyst layer is preferably 3 to 12 μm, and among them, more preferably 4 μm or more or 9 μm or less.

A pore diameter of the OSC material in the first catalyst layer is preferably 50 to 90 nm. This is because when the pore diameter of the OSC material in the first catalyst layer is 50 nm or more, gas diffusibility is improved, and when the pore diameter thereof is 90 nm or less, producing stability is enhanced.

From such viewpoint, the pore diameter of the OSC material in the first catalyst layer is preferably 50 to 90 nm, and among them, more preferably 55 nm or more or 85 nm or less, and even more preferably 60 nm or more or 80 nm or less.

(Alumina)

The first catalyst layer preferably contains a porous material mainly including alumina as an inorganic porous material on which the precious metal is supported, more particularly, a porous material comprising a compound selected from, for instance, alumina, silica-alumina, alumino-silicates, alumina-zirconia, alumina-chromia, alumina-ceria, alumina-magnesium oxide, alumina-barium oxide, alumina-lanthanum oxide, and alumina-zirconia-ceria, or a mixture of two or more of these compounds.

An average particle size (D50) of the alumina in the first catalyst layer is preferably 5 to 20 μm. When the average particle size (D50) of the alumina in the first catalyst layer is 5 μm or more, gas diffusibility in the layer and exhaust gas purification performance can be improved. Meanwhile, when the particle size of the alumina is more than 20 μm, there is a possibility that adhesiveness with the substrate becomes weak.

From such viewpoints, the average particle size (D50) of the alumina in the first catalyst layer is preferably 5 to 20 μm, and among them, more preferably 7 μm or more or 18 μm or less, and even more preferably 10 μm or more or 16 μm or less.

A pore diameter of the alumina in the first catalyst layer is preferably 15 to 35 nm. This is because when the pore diameter of the alumina in the first catalyst layer is 15 to 35 nm, purification performance can be effectively secured.

From such viewpoint, the pore diameter of the alumina in the first catalyst layer is preferably 15 to 35 nm, among them, more preferably 17 nm or more or 33 nm or less, and even more preferably 20 nm or more or 30 nm or less.

(Mixing Composition)

Alumina has a wide specific surface area, and thus a precious metal such as Pd can be dispersed and supported thereon. Meanwhile, the precious metal is compatible with an OSC material such as a ceria-zirconia composite oxide, and therefore, when the precious metal is supported on the OSC material, an anchoring effect is exerted and the OSC material is hardly sintered even a thermal load is applied thereto, thereby dispersibility can be maintained. However, since the OSC material such as a ceria-zirconia is a rare earth and expensive, it is required to reduce the usage of the rare earth while maintaining necessary OSC.

From such viewpoints, it is preferable that the first catalyst layer contains the OSC material and the alumina at a mass ratio of OSC material:alumina=1:7 to 1:3, and among them, more preferably 1:7 to 1:3.3, even more preferably 1:7 to 1:3.6, and further preferably 1:7 to 1:3.8.

Further, by examining from a different viewpoint, since alumina becomes extremely hard when it is calcined, there is a problem that the alumina or the present catalyst layer is likely to be peeled off from a substrate when the substrate, especially the SUS substrate is subjected to thermal expansion and cooling contraction that occur with a start and a stop of the engine. It has been found that when the particle size of the alumina in the first catalyst layer is large, the above problem becomes remarkable, and then the alumina or the present catalyst layer is more likely to be peeled off from a substrate. With respect to such problem, it was found for the first time that when a specified amount of the OSC material is mixed with the alumina in the first catalyst layer, the alumina or the present catalyst layer is hardly to be peeled off from the substrate, especially the SUS substrate for some reason.

Accordingly, from the viewpoint of maintaining the adhesiveness between the substrate and the present catalyst layer, it is preferable that the first catalyst layer contains the OSC material with respect to the alumina at a mass ratio of 1/5 or more, and among them, more preferably 1/4.8 or more, even more preferably 1/4.5 or more, and further preferably 1/4.2 or more. It becomes effective to employ such mixing ratio in the catalyst using alumina of which the particle size is 10 μm or more in particular.

Thus, from the viewpoint of dispersing and supporting the precious metal by the alumina, the anchoring effect by the OSC material, the price of the OSC material, and maintaining the adhesiveness between the substrate and the present catalyst layer, it is preferable that the first catalyst layer contains the OSC material and the alumina at a mass ratio of OSC material:alumina=1:5 to 1:3, and among them, more preferably 1:4.8 to 1:3.3, even more preferably 1:4.5 to 1:3.6, and further preferably 1:4.2 to 1:3.8.

(Other Components)

The first catalyst layer may contain a stabilizer if necessary.

Examples of the stabilizer may include an alkaline earth metal and an alkaline metal. Particularly, the stabilizer can be selected from one or two or more metals selected from the group consisting of magnesium, barium, boron, thorium, hafnium, silicon, calcium, and strontium.

The first catalyst layer may contain a binder if necessary.

Examples of the binder component may include an inorganic binder, for instance, an aqueous solution such as an alumina sol.

Further, the first catalyst layer may contain other components other than the above components if necessary.

<Second Catalyst Layer>

The second catalyst layer contains a precious metal, an OSC material and an alumina, wherein the catalyst layer contains the OSC material and the alumina at a mass ratio of OSC material:alumina=1:1 to 10:0.

(Precious Metal)

The second catalyst layer preferably contains a precious metal mainly including platinum (Pt), rhodium (Rh) or both of these components as a catalytically active component. That is, in the second catalyst layer, at least the largest precious metal is preferably platinum (Pt) or rhodium (Rh). Among them, it is preferable that platinum (Pt) or rhodium (Rh) accounts for 50% by mass or more in the precious metal of the second catalyst layer, more preferably 80% by mass or more, and even more preferably 90% by mass or more (including 100% by mass).

Further, when the present catalyst has a honeycomb-shape, a supported amount of Pt and Rh is preferably 0.1 to 0.5 g per 1 liter catalyst in terms of metal in the entire present catalyst, and among them, more preferably 0.12 g or more or 0.3 g or less, and even more preferably 0.14 g or more or 0.18 g or less.

(OSC Material)

Examples of the OSC material contained in the second catalyst layer may include a porous material such as a cerium oxide, a zirconium oxide and a ceria-zirconia composite oxide. The OSC material of the second catalyst layer may be the same as, or may be different from the OSC material of the first catalyst layer.

Further, an average particle size (D50) and a pore diameter of the OSC material contained in the second catalyst layer may be the same as, or may be different from those of the OSC material in the first catalyst layer, respectively.

Here, by comparing a main material of each layer, an average particle size (D50) of the main material in the first catalyst layer, that is, the alumina is preferably 10 to 16 μm, and an average particle size (D50) of the main material in the second catalyst layer, that is, the OSC material is preferably 4 to 10 μm, and further preferable value for the each component is as described above.

(Alumina)

The second catalyst layer preferably contains a porous material mainly including alumina as an inorganic porous material on which the precious metal is supported, more particularly, a porous material consisting of a compound selected from, for instance, alumina, silica-alumina, alumino-silicates, alumina-zirconia, alumina-chromia, alumina-ceria, alumina-magnesium oxide, alumina-barium oxide, alumina-lanthanum oxide, and alumina-zirconia-ceria, or a mixture of two or more of these compounds. The alumina of the second catalyst layer may be the same as, or may be different from the alumina of the first catalyst layer.

Further, an average particle size (D50) and a pore diameter of the alumina contained in the second catalyst layer may be the same as, or may be different from those of the alumina in the first catalyst layer, respectively.

(Mixing Composition)

As described above, the precious metal is compatible with an OSC material such as a ceria-zirconia composite oxide, and therefore, when the precious metal is supported on the OSC material, an anchoring effect is exerted and the OSC material is hardly sintered even a thermal load is applied thereto, thereby dispersibility can be maintained. However, since the OSC material such as a ceria-zirconia is a rare earth and expensive, it is required to reduce the usage of the rare earth while maintaining necessary OSC. Meanwhile, alumina has a wide specific surface area, and a precious metal such as Pd can be dispersed and supported thereon. On the other hand, when Rh is supported on the alumina, a rhodium compound or the like is irreversibly generated by reacting each other, and the purification performance of the Rh is deactivated. Therefore, it is preferable to make an amount of the alumina relatively small in the second catalyst layer, for instance, a content of the OSC material is preferably larger than that of the alumina.

From such viewpoints, it is preferable that the second catalyst layer contains the OSC material and the alumina at a mass ratio of OSC material:alumina=1:1 to 10:0, and among them, more preferably 2.2:1 to 10:1, even more preferably 2.2:1 to 6.3:1, further preferably 2.5:1 to 5:1, and furthermore preferably 3.0:1 to 3.8:1.

(Other Components)

The second catalyst layer may contain a stabilizer if necessary.

Examples of the stabilizer may include an alkaline earth metal and an alkaline metal. Particularly, the stabilizer can be selected from one or two or more metals selected from the group consisting of magnesium, barium, boron, thorium, hafnium, silicon, calcium, and strontium.

The second catalyst layer may contain a binder if necessary.

Examples of the binder component may include an inorganic binder, for instance, an aqueous solution such as an alumina sol.

Further, the second catalyst layer may contain other components other than the above components if necessary.

<Laminated Constitution of Present Catalyst>

Since it is sufficient that the present catalyst has only to be equipped with the second catalyst layer on the upper side of the first catalyst layer, that is, on the side opposite to the substrate, in other words, on the exhaust gas channel side, another layer may be present or may not be present between the first catalyst layer and the second catalyst layer. For instance, a layer which is not the catalyst layer, for instance, the other layer such as a layer comprising a porous refractory inorganic oxide powder or a layer comprising a porous refractory inorganic oxide powder and a promoter component, may be present between the first catalyst layer and the second catalyst layer.

A thickness of the present catalyst layer (total thickness of the first catalyst layer and the second catalyst layer) is preferably 80 to 150 μm from the viewpoint of securing catalyst performance and suppressing back pressure low.

Also, a ratio of the thickness between the first catalyst layer and the second catalyst layer is preferably the first catalyst layer:the second catalyst layer=1:1.23 to 1:1.35, among them, more preferably 1:1.26 to 1:1.3.

<Void Volume of Catalyst Layer>

In the present catalyst, it is preferable that a void volume of the present catalyst layer, that is, the catalyst layer containing both the first catalyst layer and the second catalyst layer has a first peak in a void volume diameter range of 15 to 35 nm and a second peak in a void volume diameter range of 50 to 200 nm, when the void distribution is measured by a mercury intrusion porosimeter, in the void volume diameter range of 5 to 200 nm of the obtained logarithmic differential void volume distribution.

Among them, it is more preferable that the first peak is present in a void volume diameter range of 18 to 33 nm, and even more preferable to be present in a void volume diameter range of 20 to 30 nm.

Meanwhile, it is more preferable that the second peak is present in a void volume diameter range of 50 to 150 nm, and even more preferable to be present in a void volume diameter range of 100 to 120 nm.

Thus, in the void volume diameter range of 5 to 200 nm, by producing the present catalyst so as to have a first peak in a void volume diameter range of 15 to 35 nm and a second peak in a void volume diameter range of 50 to 200 nm, catalytic reactivity can be maintained while maintaining gas diffusibility of the catalyst layer, thereby the functions as a three way catalyst can be sufficiently exerted.

Here, the "first peak" refers to a peak where the peak height is the most highest, and the "second peak" refers to a peak where the peak height is the second highest, in a logarithmic differentiation void volume distribution measured by a mercury intrusion porosimeter.

Meanwhile, a line on the assumption that such a peak is not present, that is, a peak whose vertical height is less than 0.002 ml/g from a background, does not correspond to the "peak" which the invention defines, because it is regarded as a noise of, for instance, a measuring device.

In the present catalyst, since the first peak which is present in a range of a void volume diameter of 15 to 35 nm is derived from a pore diameter of alumina and the second peak which is present in a range of a void volume diameter of 50 to 200 nm is derived from a pore diameter of OSC material, these peak positions can be controlled by changing a void volume diameter and a differential pore volume of alumina and OSC material, and furthermore, by changing an amount of the alumina and the OSC material, calcination conditions, and the like.

Meanwhile, the pore diameter of the alumina and the OSC material which are a catalyst raw material does not always coincide with the pore diameter of the catalyst layer.

The mercury intrusion porosimeter is a device that intrudes mercury into a measurement target by applying a pressure to the measurement target using high surface tension of the mercury, and that measures a void volume diameter and logarithmic differential void volume distribution from the pressure of that time and an amount of the mercury intruded under the pressure. Accordingly, the target void is only an open pore (void communicating with the outside), excluding a closed pore (independent void).

Further, the "void volume diameter" refers to a diameter of a bottom when the void is approximated to a circular cylinder, and is calculated by the following formula.

$$dr = -4\sigma \cos \theta / p$$

($\sigma$: surface tension, $\theta$: contact angle, p: pressure)

In this formula, the surface tension of the mercury is known, and the contact angle represents a characteristic value for each device. As such, the void volume diameter can be calculated from the pressure of the mercury intruded under the pressure.

Further, a void volume of the present catalyst layer can be measured by measuring the void distribution using the mercury intrusion porosimeter after peeling off only the catalyst layer from the catalyst.

<Method for Producing Present Catalyst>

The present catalyst may be formed as follows. For instance, a precious metal, alumina and an OSC material, and furthermore a stabilizer, a binder and the like if necessary, and water are mixed together and stirred to form a slurry, and the slurry thus obtained is wash coated, for instance, on a substrate such as a ceramic honeycomb body, and this is calcined to form a first catalyst layer on the substrate surface, and to then form a second catalyst layer as an upper layer (surface layer) in a similar way as described above.

Further, for instance, alumina and an OSC material, and furthermore a stabilizer, a binder and the like if necessary, and water are mixed together and stirred to form a slurry, and the slurry thus obtained is wash coated, for instance, on a substrate such as a ceramic honeycomb body, and this is subsequently immersed into an aqueous containing a precious metal and impregnated with it to form a first catalyst layer on the substrate surface, and to then form a second catalyst layer as an upper layer (surface layer) in a similar way as described above.

However, the method is not limited to such producing methods.

<Application>

The present catalyst can be suitably used for purifying an exhaust gas to be emitted from an internal-combustion engine of four-wheel automobile or saddle-riding-type vehicle such as two-wheel automobile or the like.

Particularly, the present catalyst is disposed in, for instance, an exhaust gas passage of the internal-combustion engine of saddle-riding-type vehicle, thereby the effect can be more effectively exerted. To be specific, one or more present catalysts can be disposed in, for instance, an exhaust pipe or a muffler. In this case, the present catalyst reacts with a high-temperature combustion gas and accelerates a chemical reaction (oxidation and reduction actions), and thus the present catalyst is preferably disposed directly below an exhaust port having a high exhaust gas temperature.

An example of the saddle-riding-type vehicle suitable to mount the present catalyst may include a saddle-riding-type vehicle on which an exhaust gas purifying device, in which an air-fuel ratio of the exhaust gas flowing in the exhaust gas passage is set to be 14 or more (particularly, 14.5 or more) by a combination of a carburetor and a secondary air supply mechanism, is mounted.

When the secondary air supply mechanism using a reed valve operated depending on an exhaust gas pressure is used for a secondary supply mechanism, and usually, if a negative region in exhaust gas pulsation pressure is in a slow engine speed state or in a loaded state, a supply amount of secondary air is reduced to facilitate becoming a reduction atmosphere. When the state of this reduction atmosphere goes on, catalyst performance is not stabilized. However, when the air-fuel ratio of the exhaust gas flowing in the exhaust gas passage is set to be 14 or more by the combination of the carburetor and the secondary air supply mechanism, the catalyst can be stabilized to exert the catalyst performance.

The exhaust gas purifying device suitable to set the air-fuel ratio of the exhaust gas flowing in the exhaust gas passage to be 14 or more by the combination of the carburetor and the secondary air supply mechanism may include an exhaust gas purifying device that has a dirty side and a clean side and is equipped with an air cleaner purifying air suctioned to the dirty side and supplying the air to an engine via the clean side and a secondary air supply mechanism supplying secondary air from the clean side of the air cleaner with respect to an exhaust port of the engine. The present catalyst is effectively provided for the exhaust gas passage of the internal combustion engine thereof.

As the exhaust gas purifying device as described above, for instance, an exhaust gas purifying device shown in FIG. 1 can be illustrated.

The exhaust gas purifying device 10 shown in FIG. 1 is mounted on a saddle-riding-type vehicle itself in which fuel is mixed with air supplied from an air cleaner 11 to an engine (internal combustion engine) 12 by a carburetor 13, and includes a secondary air supply mechanism 20 supplying secondary air (purified air) from the air cleaner 11 to an exhaust port 12B of the engine 12, and an exhaust muffler 15 connected to the engine 12 via an exhaust pipe 14. The present catalyst has only to be installed in the exhaust muffler 15.

Further, in FIG. 1, an arrow X indicates a flow of air, an arrow Y indicates a vacuum pressure, and an arrow Z indicates a flow of a blow-by gas generated inside a crank case.

As shown in FIG. 1, the air cleaner 11 has an air cleaner case 11A, an inside of which is partitioned into two chambers on a dirty side (open air introduction chamber) 11C and a clean side (clean air chamber) 11D by a partition wall 11B. The dirty side 11C is provided with an open air introduction port 11E, and open air is introduced into the dirty side 11C via the open air introduction port 11E. A filter element 11F is disposed on the partition wall 11B so as to cover an opening that causes the dirty side 11C and the clean side 11D to communicate with each other. The air inside the dirty side 11C passes through the filter element 11F, and is then introduced to the clean side 11D. The clean side 11D is provided with an air discharge port 11G, and the air discharge port 11G is connected to the carburetor 13 via a connecting tube 16, and communicates with an intake port 12A of the engine 12 via the carburetor 13.

The engine 12 is a typical 2-cycle engine or a 4-cycle engine mounted on, for instance, a motorcycle, and includes an intake valve 12D opening/closing the intake port 12A communicating with a cylinder hole (cylinder) 12C inside the engine 12, and an exhaust valve 12E opening/closing the exhaust port 12B communicating with the cylinder hole 12C. A piston 12F that is slidably disposed in the cylinder hole 12C is connected to a crank shaft 12H via a connecting rod 12G. In the case of an intake stroke during which the piston 12F moves downward in a state in which the intake valve 12D of the engine 12 is open (whereas the exhaust valve 12E is closed), the air inside the clean side 11D of the air cleaner 11 is suctioned to an upper side of the piston 12F of the cylinder hole 12C via the carburetor 13 by a negative pressure on the side of the engine 12 generated by the downward movement of the piston 12F, and the fuel is supplied from the carburetor 13. A mixture of the fuel and the air is supplied to the engine 12.

Subsequently, after general compression stroke and combustion process of the 4-cycle engine, an exhaust stroke during which the piston 12F moves upward in a state in which the exhaust valve 12E is open (whereas the intake valve 12D is closed) is carried out. Thereby, a combustion gas is discharged to the exhaust port 12B, and is discharged to the exhaust pipe 14 as the exhaust gas.

The exhaust muffler 15 is connected to a rear end of the exhaust pipe 14. This exhaust muffler 15 functions as a silencer that silences the high-temperature high-pressure exhaust gas passing through the exhaust pipe 14 and discharges the silenced exhaust gas to the outside.

In FIG. 1, the exhaust muffler 15 is configured in a multistage expansion form in which it is partitioned into a plurality of chambers by a plurality of partitions 15A and 15B, and each chamber is spatially connected by communication pipes 15C, 15D, and 15E. The catalyst may be disposed in a front chamber located on an uppermost stream side.

The secondary air supply mechanism 20 is a mechanism that send the air (secondary air) of the clean side 11D of the air cleaner 11 to the exhaust port 12B of the engine 12, and is equipped with a secondary air supply pipe 21 connecting the clean side 11D of the air cleaner and the exhaust port 12B of the engine 12. A valve unit 22 is provided in the middle of the secondary air supply pipe 21, and a reed valve 23 for preventing the exhaust gas from flowing from the exhaust port 12B back to the secondary air supply pipe 21 is installed between the valve unit 22 and the exhaust port 12B. Further, FIG. 1 shows a state in which, from the viewpoint of improving followability of the reed valve 23, the reed valve 23 is arranged above the engine 12 at a position nearer than the exhaust port 12B.

The valve unit 22 is equipped with a secondary air supply control valve 24 for preventing the secondary air from being supplied to the exhaust port 12B during deceleration of the engine. The secondary air supply control valve 24 is configured to operate depending on the vacuum pressure of the intake port 12A which is transmitted via a communication pipe 25 connecting the intake port 12A of the engine 12 and the valve unit 22.

Further, the reference number 35 in the figure indicates a communication pipe that spatially connects the clean side 11D of the air cleaner 11 and the crank case of the engine 12. The communication pipe 35 functions as a crank case emission controller that returns a blow-by gas generated inside the crank case to the engine 12 through the air cleaner 11 and the carburetor 13 and prevents the blow-by gas from being released.

In general, in the case of using the carburetor 13, an oxygen concentration in the exhaust gas is also liable to become lean, because the air-fuel ratio is set to the rich side to smoothly follow a request for acceleration from a driver. Thus, as the oxygen concentration in the exhaust gas is increased by providing the secondary air supply mechanism 20, the secondary air supply mechanism 20 and the carburetor 13 are preferably set to stabilize a purifying function to at least satisfy, for instance, a durable distance (traveling distance that maintains a state equal to or less than an exhaust gas regulation value) of exhaust gas regulations provided depending on the country.

As the carburetor 13 and the secondary air supply mechanism 20 are adjusted and improved to change the air-fuel ratio of a catalyst inlet, the air-fuel ratio of the catalyst inlet can be set to be 15 or more in all regions of 55 km/h or less. Thereby, even when a relative low-cost carburetor is used for a small vehicle, durability deterioration of the catalyst can be suppressed within a request level of the exhaust gas regulations while avoiding poor drivability caused by reducing the air-fuel ratio, and the performance of the catalyst can be stabilized over a long period.

Description of Terminology

In the invention, the term "saddle-riding-type vehicle" refers to including not only a saddle-riding-type two-wheeled vehicle, a saddle-riding-type three-wheeled vehicle, a saddle-riding-type four-wheeled vehicle, called a saddle-riding-type vehicle in general, but also a scooter type motorcycle.

In the case of being expressed as the phase "X to Y" (X and Y are arbitrary numbers) in the invention, the phase includes the meaning of "preferably more than X" or "preferably less than Y" along with the meaning "X or more and Y or less" unless otherwise stated.

Further, in the case of being expressed as the phrase "X or more" (X is an arbitrary number) or the phase "Y or less" (Y is an arbitrary number), the phrase also includes the intention of being "preferably more than X" or "preferably less than Y."

EXAMPLES

Hereinafter, the invention will be described in greater detail on the basis of examples and comparative examples.

[Examination of Content of OSC Material and Alumina in Each Layer]

By changing a mass ratio of the OSC material and the alumina in the first catalyst layer and the second catalyst layer, the most suitable ratio was examined.

Example 1

A ceria-zirconia composite oxide B10 (D50: 6.5 μm, pore diameter: 66 nm, BET specific surface area: 38 m$^2$/g), an alumina A4 (D50: 13 μm, pore diameter: 22 nm, BET specific surface area: 105 m$^2$/g), and an alumina sol as an inorganic binder were prepared respectively.

With regard to a substrate, a metal honeycomb carrier made of stainless steel (300 cells, ϕ30 mm×L30 mm, 21 cc of test pieces volume) was calcined at 500° C. for one hour, thereby oil and dusts attached to the carrier were eliminated.

A Pd nitrate solution was added with pure water, and 65 parts by mass of the alumina A4 was added thereto, and was then stirred for two hours. Thereafter, 16 parts by mass of the ceria-zirconia composite oxide B10 and 12 parts by mass of the binder material were added thereto, thereby obtaining a first catalyst layer Pd-containing slurry (Pd: 1.6 parts by mass).

Meanwhile, a Rh nitrate solution was added with pure water, and 70 parts by mass of the ceria-zirconia composite oxide B10 was added thereto, and was then stirred for two hours. Thereafter, 20 parts by mass of the alumina A4 and 8 parts by mass of the binder material were added thereto, thereby obtaining a second catalyst layer Rh-containing slurry (Rh: 0.2 part by mass).

Next, the metal honeycomb carrier made of stainless steel was immersed into the first catalyst layer Pd-containing slurry, and then a surplus slurry in the cell was removed by air blowing. Thereafter, the metal honeycomb carrier was dried, and was calcined at 500° C. for one hour under air atmosphere, thereby forming a first catalyst layer.

Next, the metal honeycomb carrier forming the first catalyst layer was immersed into the second catalyst layer Rh-containing slurry, and then a surplus slurry in the cell was removed by air blowing. Thereafter, the metal honeycomb carrier was dried, and was calcined at 500° C. for one hour under air atmosphere so as to form a second catalyst layer, thereby producing a catalyst (sample).

In the produced catalyst (sample), a supported amount of Pd was 1.4 g per 1 liter catalyst in terms of metal, and a supported amount of Rh was 0.16 g per 1 liter catalyst in terms of metal.

Example 2

A catalyst (sample) was produced in the same manner as in Example 1 except that the blending amount of the alumina A4 in the first catalyst layer Pd-containing slurry was changed to 70 parts by mass, and the blending amount of the ceria-zirconia composite oxide B10 was changed to 11 parts by mass in Example 1.

Example 3

A catalyst (sample) was produced in the same manner as in Example 1 except that the blending amount of the ceria-zirconia composite oxide B10 in the second catalyst layer Rh-containing slurry was changed to 90 parts by mass, and the blending amount of the alumina A4 was changed to 0 part by mass in Example 1.

Comparative Example 1

A catalyst (sample) was produced in the same manner as in Example 1 except that the blending amount of the alumina A4 in the first catalyst layer Pd-containing slurry was changed to 41 parts by mass, and the blending amount of the ceria-zirconia composite oxide B10 was changed to 40 parts by mass in Example 1.

Comparative Example 2

A catalyst (sample) was produced in the same manner as in Example 1 except that the blending amount of the ceria-zirconia composite oxide B10 in the second catalyst layer Rh-containing slurry was changed to 40 parts by mass, and the blending amount of the alumina A4 was changed to 50 parts by mass in Example 1.

Incidentally, with regard to the ceria-zirconia composite oxide, alumina, Pd, and Rh, the value of the blending amount at the time of the production and the value of the content as measured after the catalyst production are equivalent (the same is applied for the other Examples and Comparative Examples).

A pore diameter of the ceria-zirconia composite oxide and the alumina which were used as a raw material is a value of the void volume diameter of the first peak where the peak height is the most highest in the logarithmic differential void volume distribution which was obtained by measuring in the same manner as the logarithmic differential void volume distribution measurement to be described below.

<Evaluation Method of Catalyst>

Each catalyst (sample) produced in Examples 1 to 3 and Comparative Examples 1 and 2 was introduced into an electric furnace maintained at 900° C., and was heat treated for 24 hours while circulating a mixed gas comprised of $C_3H_6$, $O_2$ and $N_2$, which was adjusted to A/F=14.5, at 20 L/min. Thereafter, the catalyst (sample) was cooled to room temperature. Subsequently, a temperature (° C.) that reached a 50% purification ratio of each of CO, HC and NOx in a model gas of the following composition was measured, and then three way purification performance of each catalyst was evaluated. The evaluation conditions are described as follows.

(Model Gas Composition)
CO: 0.9%
$C_3H_6$: 900 ppm
$C_3H_8$: 450 ppm
NO: 1000 ppm
$O_2$: 0.85%
$CO_2$: 14%
$H_2O$: 10%
$N_2$: balance
A/F: 14.5
Gas flow rate: 50 L/min
Temperature rising rate: 20° C./min preferably 2.2:1 to 6.3:1, further preferably 2.5:1 to 5:1, and furthermore preferably 3.0:1 to 3.8:1.

[Examination of Amount of OSC Material and Alumina in Terms of Adhesiveness]

By changing a mass ratio of the OSC material and the alumina in the first catalyst layer and the second catalyst layer, the most suitable ratio was examined from a viewpoint of adhesiveness with a substrate.

Example 4

A catalyst (sample) was produced in the same manner as in Example 1 except that an alumina (D50: 13 μm, pore diameter: 28 nm, BET specific surface area: 99 m²/g) was used instead of the alumina A4 of the first layer in Example 1.

Example 5

A catalyst (sample) was produced in the same manner as in Example 1 except that a ceria-zirconia composite oxide (D50: 6.5 μm, pore diameter: 50 nm, BET specific surface area: 39 m²/g) was used instead of the ceria-zirconia composite oxide B10 of the second layer in Example 1.

Example 6

A catalyst (sample) was produced in the same manner as in Example 1 except that the coated amount of the slurry in the first layer decreased by 20%, and the coated amount of the slurry in the second layer increased by 20% in Example 1 as shown in Table 2.

Example 7

A catalyst (sample) was produced in the same manner as in Example 1 except that the coated amount of the slurry in the first layer increased by 20%, and the coated amount of the slurry in the second layer decreased by 20% in Example 1 as shown in Table 2.

TABLE 1

| | First catalyst layer (lower layer) | | | | | | Second catalyst layer (upper layer) | | | | | | T50 (° C.) | | |
|---|---|---|---|---|---|---|---|---|---|---|---|---|---|---|---|
| | Amount (parts by mass) | | Particle size (μm) | | Pore diameter (nm) | | Amount (parts by mass) | | Panda size (μm) | | Pore diameter (nm) | | | | |
| | Alumina | OSC | Alumina | OSC | Alumina | OSC | Alumina | OSC | Alumina | OSC | Alumina | OSC | CO | HC | NOx |
| Example 1 | 65 | 16 | 13 | 6.5 | 22 | 66 | 20 | 70 | 13 | 6.5 | 22 | 66 | 442 | 424 | 428 |
| Example 2 | 70 | 11 | 13 | 6.5 | 22 | 66 | 20 | 70 | 13 | 6.5 | 22 | 66 | 440 | 427 | 425 |
| Example 3 | 65 | 16 | 13 | 6.5 | 22 | 66 | 0 | 90 | 13 | 6.5 | 22 | 66 | 440 | 428 | 431 |
| Comparative Example 1 | 41 | 40 | 13 | 6.5 | 22 | 66 | 20 | 70 | 13 | 6.5 | 22 | 66 | 452 | 433 | 447 |
| Comparative Example 2 | 65 | 16 | 13 | 6.5 | 22 | 66 | 50 | 40 | 13 | 6.5 | 22 | 66 | 456 | 430 | 441 |

From the results of Examples and Comparative Examples and the test results which the present inventors have been conducted so far, and in terms of reducing the usage of the rare earth having an OSC while maintaining a necessary OSC, it can be considered that the first catalyst layer preferably contains the OSC material and the alumina at a mass ratio of OSC material:alumina=1:7 to 1:3, and among them, more preferably 1:5.6 to 1:3.3, even more preferably 1:5 to 1:3.6, and further preferably 1:4.2 to 1:3.8.

Meanwhile, it can be considered that the second catalyst layer preferably contains the OSC material and the alumina at a mass ratio of OSC material:alumina=1:1 to 10:0, and among them, more preferably 2.2:1 to 10:1, even more Comparative Example 3

A catalyst (sample) was produced in the same manner as in Example 1 except that the blending amount of the alumina A4 in the first catalyst layer Pd-containing slurry was changed to 81 parts by mass, and the blending amount of the ceria-zirconia composite oxide B10 was changed to 0 part by mass in Example 1.

<Adhesiveness Test>

The catalyst (sample) which was kept in storage at a room temperature atmosphere under the air was placed in an electric furnace heated at 900° C., and was left to stand for 60 minutes such that the product temperature reached 900° C. Thereafter, the catalyst (sample) was taken out to be exposed in the room temperature atmosphere under the air, and a surface of the catalyst (sample) was observed.

In all different product lot, samples in which a peeling was not observed were evaluated as "○ (good)", samples in which a peeling was observed in a part of the product lot were evaluated as "Δ (usual)", and samples in which a peeling was observed in all the different product lot were evaluated as "x (poor)".

TABLE 2

| | First catalyst layer (lower layer) | | | | | | Second catalyst layer (upper layer) | | | | | | |
|---|---|---|---|---|---|---|---|---|---|---|---|---|---|
| | Amount (parts by mass) | | Particle size (μm) | | Pore diameter (nm) | | Amount (parts by mass) | | Particle size (μm) | | Pore diameter (nm) | | Adhesive- |
| | Alumina | OSC | Alumina | OSC | Alumina | OSC | Alumina | OSC | Alumina | OSC | Alumina | OSC | ness |
| Example 1 | 65 | 16 | 13 | 6.5 | 22 | 66 | 20 | 70 | 13 | 6.5 | 22 | 66 | ○ |
| Example 2 | 70 | 11 | 13 | 6.5 | 22 | 66 | 20 | 70 | 13 | 6.5 | 22 | 66 | Δ |
| Example 3 | 65 | 16 | 13 | 6.5 | 22 | 66 | 0 | 90 | 13 | 6.5 | 22 | 66 | ○ |
| Example 4 | 65 | 16 | 13 | 6.5 | 28 | 66 | 20 | 70 | 13 | 6.5 | 22 | 66 | ○ |
| Example 5 | 65 | 16 | 13 | 6.5 | 22 | 66 | 20 | 70 | 13 | 6.5 | 22 | 50 | ○ |
| Example 6 | 52 | 12.8 | 13 | 6.5 | 22 | 66 | 24 | 84 | 13 | 6.5 | 22 | 66 | ○ |
| Example 7 | 78 | 19.2 | 13 | 6.5 | 22 | 66 | 16 | 56 | 13 | 6.5 | 22 | 66 | ○ |
| Comparative Example 3 | 81 | 0 | 13 | 6.5 | 22 | 66 | 20 | 70 | 13 | 6.5 | 22 | 66 | x |

As the results of Examples and Comparative Examples, in the first catalyst layer, when a mass ratio of the OSC material and the alumina was OSC material:alumina=0:81, a peeling was observed in the catalyst layer (Comparative Example 3), and when the mass ratio of the OSC material and the alumina was OSC material:alumina=11:70, a peeling was observed in a part of the catalyst layer (Example 2). On the other hand, when a ratio of the OSC material was too high, a tendency of the deterioration in purification performance was also seen (refer to Table 1). Further, in particular, an improvement in NOx purification performance was confirmed in Examples, as compared with in Comparative Examples.

Thus, taking the adhesiveness between the substrate and the first catalyst layer and the purification performance into consideration in a comprehensive way, from the results of Examples and Comparative Examples and the test results which the present inventors have been conducted so far, it can be considered that a mass ratio of the OSC material and the alumina in the first catalyst layer is preferably 1:5 to 1:3, and among them, more preferably 1:4.8 to 1:3.3, even more preferably 1:4.5 to 1:3.6, and further preferably 1:4.2 to 1:3.8.

[Examination of Particle Size and Pore Diameter of Alumina and OSC Material]

By changing a particle size and a pore diameter of the alumina and the OSC material in the first catalyst layer and the second catalyst layer, the most suitable void distribution in the present catalyst layer was examined.

Example 8

A catalyst (sample) was produced in the same manner as in Example 1 except that an alumina (D50: 13 μm, pore diameter: 12 nm, BET specific surface area: 120 m²/g) was used instead of the alumina A4 of the first catalyst layer in Example 1.

Example 9

A catalyst (sample) was produced in the same manner as in Example 1 except that a ceria-zirconia composite oxide (D50: 6.5 μm, pore diameter: 26 nm, BET specific surface area: 60 m²/g) was used instead of the ceria-zirconia composite oxide B10 of the second catalyst layer in Example 1.

Example 10

A catalyst (sample) was produced in the same manner as in Example 1 except that an alumina (D50: 2 μm, pore diameter: 22 nm, BET specific surface area: 104 m²/g) was used instead of the alumina A4 of the first catalyst layer in Example 1.

Example 11

A catalyst (sample) was produced in the same manner as in Example 1 except that an alumina (D50: 25 μm, pore diameter: 22 nm, BET specific surface area: 102 m²/g) was used instead of the alumina A4 of the first catalyst layer in Example 1.

Example 12

A catalyst (sample) was produced in the same manner as in Example 1 except that a ceria-zirconia composite oxide (D50: 1 μm, pore diameter: 66 nm, BET specific surface area: 37 m²/g) was used instead of the ceria-zirconia composite oxide B10 of the second catalyst layer in Example 1.

Example 13

A catalyst (sample) was produced in the same manner as in Example 1 except that a ceria-zirconia composite oxide (D50: 16 μm, pore diameter: 66 nm, BET specific surface area: 38 m²/g) was used instead of the ceria-zirconia composite oxide B10 of the second catalyst layer in Example 1.

<Measurement of Logarithmic Differential Void Volume Distribution>

A catalyst layer was peeled off from each catalyst (sample) produced in Examples 1, 4 and 5 and Comparative Examples 8 to 13, and a void distribution thereof was measured as follows.

Measurement of logarithmic differential void volume distribution is a method of changing a pressure applied to mercury, and measuring an amount of the mercury penetrating into pores on this occasion, thereby measuring pore (void) distribution.

Assuming that a pressure is given as P, that a pore diameter is given as D, and that a contact angle and surface tension of the mercury are given as θ and σ respectively, a condition under which the mercury can intrude into the pores can be expressed from an equilibrium of force by PD=−4σ cos θ. In this case, if the contact angle and the surface tension are constants, the pressure P and the pore diameter D into which the mercury can intrude on this occasion are in inverse proportion. For this reason, the pressure P and a liquid volume V to intrude on this occasion are measured by changing the pressure, and the transverse axis P of the obtained P-V curve is replaced from such a (3) Measuring 85 points at a high pressure part within a range of 0.2241 to 255.1060 MPa.
(4) Calculating pore diameter distribution from a mercury injection pressure and a mercury injection quantity. Incidentally, (2), (3), and (4) above were automatically performed by software installed in the device.

Each position of a first peak and a second peak in a void volume diameter range of 5 to 200 nm of the logarithmic differential void volume distribution obtained by measuring as described above was shown in Table 3.

<Evaluation Method of Catalyst>

Three way purification performance of each catalyst (sample) was evaluated in a similar way as described above.

| | First catalyst layer (lower layer) | | | | | | Second catalyst layer (upper layer) | | | | | | Void volume diameter | | T50 (° C.) | | |
|---|---|---|---|---|---|---|---|---|---|---|---|---|---|---|---|---|---|
| | Amount (parts by mass) | | Particle size (μm) | | Pore diameter (nm) | | Amount (parts by mass) | | Particle size (μm) | | Pore diameter (nm) | | First peak (nm) | Second peak (nm) | | | |
| | Alumina | OSC | Alumina | OSC | Alumina | OSC | Alumina | OSC | Alumina | OSC | Alumina | OSC | | | CO | HC | NOx |
| Example 1 | 65 | 1.6 | 13 | 6.5 | 22 | 66 | 20 | 70 | 13 | 6.5 | 22 | 66 | 23 | 115 | 442 | 424 | 428 |
| Example 4 | 65 | 1.6 | 13 | 6.5 | 28 | 66 | 20 | 70 | 13 | 6.5 | 22 | 66 | 27 | 119 | 440 | 423 | 430 |
| Example 5 | 65 | 1.6 | 13 | 6.5 | 22 | 66 | 20 | 70 | 13 | 6.5 | 22 | 50 | 23 | 65 | 445 | 428 | 433 |
| Example 8 | 65 | 1.6 | 13 | 6.5 | 12 | 66 | 20 | 70 | 13 | 6.5 | 22 | 66 | 12 | 113 | 448 | 429 | 450 |
| Example 9 | 65 | 1.6 | 13 | 6.5 | 22 | 66 | 20 | 70 | 13 | 6.5 | 22 | 26 | 23 | 23 | 448 | 430 | 444 |
| Example 10 | 65 | 1.6 | 2 | 6.5 | 22 | 66 | 20 | 70 | 13 | 6.5 | 22 | 66 | 22 | 113 | 451 | 429 | 446 |
| Example 11 | 65 | 1.6 | 25 | 6.5 | 22 | 66 | 20 | 70 | 13 | 6.5 | 22 | 66 | 23 | 115 | 449 | 428 | 448 |
| Example 12 | 65 | 1.6 | 13 | 6.5 | 22 | 66 | 20 | 70 | 13 | 1 | 22 | 66 | 22 | 114 | 450 | 427 | 445 |
| Example 13 | 65 | 1.6 | 13 | 6.5 | 22 | 66 | 20 | 70 | 13 | 16 | 22 | 66 | 22 | 115 | 447 | 428 | 444 | formula by the pore diameter with no change, so that it is possible to find the pore distribution.

The measurement was performed on the following conditions in the following procedure using an automatic porosimeter "AutoPore IV9520" manufactured by Shimadzu Co., Ltd. as a measuring device.

(Measurement Conditions)
Measurement environment: 25° C.
Measurement cell: sample chamber volume of 3 cm³, and intrusion volume of 0.39 cm³
Measurement range: from 0.0048 MPa to 255.106 MPa
Measurement point: 131 points (where the points were carved to be at equal intervals when the pore diameter was applied by the logarithm)
Intrusion volume: adjusted to be 25% or more and 80% or less.
(Low-Pressure Parameters)
Exhaust pressure: 50 μmHg
Exhaust time: 5.0 min
Mercury injection pressure: 0.0034 MPa
Equilibrium time: 10 secs
(High-Pressure Parameter)
Equilibrium time: 10 secs
(Mercury Parameters)
Advance contact angle: 130.0 degrees
Retreat contact angle: 130.0 degrees
Surface tension: 485.0 mN/m (485.0 dynes/cm)
Mercury density: 13.5335 g/mL
(Measurement Procedure)
(1) Each of the catalysts (samples) obtained in Examples and Comparative Examples was cored from the center to obtain a volume of 5 mm×5 mm×10 mm, and measurement was carried out therewith.
(2) Measuring 46 points at a low pressure part within a range of 0.0048 to 0.2068 MPa.

From the results of Examples and Comparative Examples and the test results which the present inventors have been conducted so far, in the void volume diameter range of 5 to 200 nm of the logarithmic differential void volume distribution, it was found that the catalyst preferably had a first peak in a void volume diameter range of 15 to 35 nm and a second peak in a void volume diameter range of 50 to 200 nm.

Among them, it can be considered that the first peak is preferably present in a void volume diameter range of 18 to 33 nm, and even more preferable to be present in a void volume diameter range of 20 to 30 nm.

Meanwhile, it can be considered that the second peak is preferably present in a void volume diameter range of 50 to 150 nm, and even more preferable to be present in a void volume diameter range of more than 100 nm and 120 nm or less.

[Examination of Precious Metal Supported Amount and Laminated Constitution]

By changing a supported amount of a precious metal and a laminated constitution in the first catalyst layer and the second catalyst layer, the most suitable range was examined.

Comparative Example 10

A catalyst (sample) was produced in the same manner as in Example 1 except that the metal honeycomb carrier made of stainless steel was immersed into the second catalyst layer Rh-containing slurry to form a catalyst layer, and then this is immersed into the first catalyst layer Pd-containing slurry to form a catalyst layer in Example 1. In other words, a catalyst (sample) was produced in the same manner as in Example 1 except that the composition of the first catalyst layer and the second catalyst layer are reversed in Example 1.

Comparative Example 11

A ceria-zirconia composite oxide B10 (D50: 6.5 µm, pore diameter: 66 nm, BET specific surface area: 38 m²/g), an alumina A4 (D50: 13 µm, pore diameter: 22 nm, BET specific surface area: 105 m²/g), and an alumina sol as an inorganic binder were prepared respectively.

With regard to a substrate, a metal honeycomb carrier made of stainless steel was calcined at 500° C. for one hour, thereby oil and dusts attached to the carrier were eliminated.

A Pd nitrate solution (Pd: 1.6 parts by mass) was added with pure water, and 39 parts by mass of the alumina A4 was added thereto, and was then stirred for two hours. Thereafter, 39 parts by mass of the ceria-zirconia composite oxide B10 and a Rh nitrate solution (Rh: 0.2 part by mass) were added thereto and were stirred for two hours, and then 10 parts by mass of the binder material was added thereto, thereby obtaining a catalyst layer Pd/Rh-containing slurry.

Next, the metal honeycomb carrier made of stainless steel (300 cells, φ30×30 L, 21 cc of test pieces volume) was immersed into the catalyst layer Pd/Rh-containing slurry, and then a surplus slurry in the cell was removed by air blowing. Thereafter, the metal honeycomb carrier was dried, and was calcined at 500° C. for one hour under air atmosphere to form a first catalyst layer, thereby producing a catalyst (sample).

A supported amount of Pd was 1.4 g per 1 liter catalyst in terms of metal, and a supported amount of Rh was 0.16 g per 1 liter catalyst in terms of metal.

<Evaluation Method of Catalyst>

Three way purification performance of each catalyst (sample) was evaluated in a similar way as described above.

obtained. Thus, it was found that the supported amount of Pd was preferably 0.5 to 2.0 g per 1 liter catalyst in terms of metal.

Meanwhile, it was found that when a supported amount of Rh was less than 0.1 g per 1 liter catalyst in terms of metal, the exhaust gas purification performance tended to be insufficient, and conversely, when the supported amount of Rh was more than 0.5 g, there was a tendency that a product cost increased and an enhancement of the effect that worth the cost was not obtained. Thus, it was found that the supported amount of Rh was preferably 0.1 to 0.5 g per 1 liter catalyst in terms of metal.

Further, in particular, an improvement in NOx purification performance was confirmed in Examples, as compared with in Comparative Examples.

[Real Vehicle Test]

Each of the catalysts (samples) obtained in Examples 1 to 3 and the catalysts (samples) obtained in Comparative Examples 1 and 2 was mounted on a motorcycle on which the exhaust gas purifying device shown in FIG. 1 was mounted to perform a real vehicle endurance test.

The results were shown in FIG. 2.

As a result, it was found that the result of the real vehicle test was similar to the result of the above evaluation tests in which the model gas was used.

The invention claimed is:

1. An exhaust gas purifying catalyst having a first catalyst layer which is formed on a surface of a substrate comprising a ceramic or a metal and a second catalyst layer which is formed on the upper side of the first catalyst layer,
   wherein the first catalyst layer comprises a precious metal, an OSC material and an alumina, and the OSC material

|  | First catalyst layer (lower layer) | | | | | | Second catalyst layer (upper layer) | | | | | | T50 (° C.) | | |
|---|---|---|---|---|---|---|---|---|---|---|---|---|---|---|---|
|  | Amount (parts by mass) | | Particle size (µm) | | Pore diameter (nm) | | Amount (parts by mass) | | Particle size (µm) | | Pore diameter (nm) | | | | |
|  | Alumina | OSC | Alumina | OSC | Alumina | OSC | Alumina | OSC | Alumina | OSC | Alumina | OSC | CO | HC | NOx |
| Example 1 | 65 | 16 | 13 | 6.5 | 22 | 66 | 20 | 70 | 13 | 6.5 | 22 | 66 | 442 | 424 | 428 |
| Example 6 | 52 | 12.8 | 13 | 6.5 | 22 | 66 | 24 | 84 | 13 | 6.5 | 22 | 66 | 449 | 428 | 432 |
| Example 7 | 78 | 19.2 | 13 | 6.5 | 22 | 66 | 16 | 56 | 13 | 6.5 | 22 | 66 | 448 | 429 | 436 |
| Comparative Example 10 | 20 | 70 | 13 | 6.5 | 22 | 66 | 65 | 16 | 13 | 6.5 | 22 | 66 | 461 | 439 | 462 |
| Comparative Example 11 | 39 | 39 | 13 | 6.5 | 22 | 66 | 0 | 0 |  |  |  |  | 456 | 436 | 452 |

From the results of Examples and Comparative Examples and the test results which the present inventors have been conducted so far, it was found that Pd and Rh were preferably disposed in separate layers as precious metal, and particularly, the first catalyst layer (lower layer) preferably contained Pd as precious metal and the second catalyst layer (upper layer) preferably contained Rh.

Incidentally, since it has been conventionally known that Rh and Pt have similar effect and features (for instance, refer to JP 2013-220401 A, JP 2014-144426 A, and the like), it can be considered that the similar effect can be obtained even if the Rh of Examples above is replaced with Pt.

It was found that when a supported amount of Pd was less than 0.5 g per 1 liter catalyst in terms of metal, the exhaust gas purification performance tended to be insufficient, and conversely, when the supported amount of Pd was more than 2.0 g, there was a tendency that a product cost increased and an enhancement of the effect that worth the cost was not and the alumina are comprised at a mass ratio of OSC material:alumina=1:7 to 1:3, and
the second catalyst layer comprises a precious metal, an OSC material and an alumina, and the OSC material and the alumina are comprised at a mass ratio of OSC material:alumina=2.2:1 to 10:1.

2. The exhaust gas purifying catalyst according to claim 1, wherein an average particle size (D50) of the alumina in the first catalyst layer is 10 to 16 µm, and an average particle size (D50) of the OSC material in the first catalyst layer is 3 to 12 µm.

3. The exhaust gas purifying catalyst according to claim 2, wherein a mass ratio of the OSC material and the alumina in the first catalyst layer is OSC material:alumina=1:5 to 1:3.

4. The exhaust gas purifying catalyst according to claim 2, wherein a material of the substrate is stainless steel (SUS).

5. The exhaust gas purifying catalyst according to claim 2, having a first peak within a range of a void volume diameter of 15 to 35 nm and a second peak within a range of a void volume diameter of 50 to 200 nm, in a range of void volume diameter of 5 to 200 nm in a logarithmic differentiation void volume distribution measured by a mercury intrusion porosimeter.

6. The exhaust gas purifying catalyst according to claim 2, wherein a pore diameter of the alumina in the first catalyst layer is 15 to 35 nm.

7. The exhaust gas purifying catalyst according to claim 2, wherein a pore diameter of the OSC material in the second catalyst layer is 50 to 90 nm.

8. The exhaust gas purifying catalyst according to claim 1, wherein a mass ratio of the OSC material and the alumina in the first catalyst layer is OSC material:alumina=1:5 to 1:3.

9. The exhaust gas purifying catalyst according to claim 8, wherein a material of the substrate is stainless steel (SUS).

10. The exhaust gas purifying catalyst according to claim 8, having a first peak within a range of a void volume diameter of 15 to 35 nm and a second peak within a range of a void volume diameter of 50 to 200 nm, in a range of void volume diameter of 5 to 200 nm in a logarithmic differentiation void volume distribution measured by a mercury intrusion porosimeter.

11. The exhaust gas purifying catalyst according to claim 8, wherein a pore diameter of the alumina in the first catalyst layer is 15 to 35 nm.

12. The exhaust gas purifying catalyst according to claim 1, wherein a material of the substrate is stainless steel (SUS).

13. The exhaust gas purifying catalyst according to claim 12, having a first peak within a range of a void volume diameter of 15 to 35 nm and a second peak within a range of a void volume diameter of 50 to 200 nm, in a range of void volume diameter of 5 to 200 nm in a logarithmic differentiation void volume distribution measured by a mercury intrusion porosimeter.

14. The exhaust gas purifying catalyst according to claim 12, wherein a pore diameter of the alumina in the first catalyst layer is 15 to 35 nm.

15. The exhaust gas purifying catalyst according to claim 1, having a first peak within a range of a void volume diameter of 15 to 35 nm and a second peak within a range of a void volume diameter of 50 to 200 nm, in a range of void volume diameter of 5 to 200 nm in a logarithmic differentiation void volume distribution measured by a mercury intrusion porosimeter.

16. The exhaust gas purifying catalyst according to claim 15, wherein a pore diameter of the alumina in the first catalyst layer is 15 to 35 nm.

17. The exhaust gas purifying catalyst according to claim 1, wherein a pore diameter of the alumina in the first catalyst layer is 15 to 35 nm.

18. The exhaust gas purifying catalyst according to claim 1, wherein a pore diameter of the OSC material in the second catalyst layer is 50 to 90 nm.

19. The exhaust gas purifying catalyst according to claim 1, wherein an average particle size (D50) of the alumina in the first catalyst layer is 13 to 16 µm, and an average particle size (D50) of the OSC material in the first catalyst layer is 3 to 12 µm.

20. The exhaust gas purifying catalyst according to claim 1, wherein
a pore diameter of the alumina in the first catalyst layer is 15 to 35 nm,
a pore diameter of the OSC material in the second catalyst layer is 50 to 90 nm,
a content of the alumina is larger than a content of the OSC material in the first catalyst layer, and
a content of the OSC material is larger than a content of the alumina in the second catalyst layer.

* * * * *